United States Patent

[11] 3,542,078

[72] Inventor Joseph R. Lykle
 1105 Austin, Park Ridge, Illinois 60068
[21] Appl. No. 707,041
[22] Filed Feb. 21, 1968
[45] Patented Nov. 24, 1970

[54] FLEXIBLE AND EXTENSIBLE HOSE
 3 Claims, 6 Drawing Figs.
[52] U.S. Cl. ................................................. 138/122,
 138/129
[51] Int. Cl. ................................................. F16l 11/04
[50] Field of Search ........................................ 138/121,
 122, 129

[56] References Cited
UNITED STATES PATENTS
3,255,780  6/1966  Squirrell..................... 138/122

Primary Examiner—Houston S. Bell, Jr.
Attorney—Dominik, Knetchtel & Godula

ABSTRACT: A hose or conduit having a substantially circular configuration which retains its shape in normal use. The hose is formed of a resilient strip which is helically wound, interlocked, and bonded to itself to form a flexible and extensible hose of desirable length. The resilient strip has a convoluted cross section having oppositely disposed and offset channels formed by convoluted portions of the strip. A member or a portion of the convoluted strip is seated and interlocked in the channels as the strip is helically formed is in the process of making a length of hose. The members and portions of the convoluted strip in the formed hose are laterally displaceable to make the hose extensible, and the resilient character of such strips urges the members and portions back to their original position to impart resiliency to the hose.

Patented Nov. 24, 1970

3,542,078

Inventor
Joseph R. Lykle
By Burmeister, Kulie, Southard & Godula
Attorneys

FLEXIBLE AND EXTENSIBLE HOSE

This invention relates to a resilient hose which has a substantially circular configuration that resists collapse in normal use. The invention particularly relates to a hose formed essentially of a resilient integral strip in which an inside cylindrical passageway is kept intact and operative without substantial reduction in its cross-sectional area.

Resilient and extensible hoses have many industrial and consumer applications. A common widespread use is as a vacuum conduit in ordinary vacuum cleaners. Conduits are also used in industrial machinery which conveys products such as glass wool by blowing under a positive pressure. When hoses are used in such applications, it is necessary that the circular configuration of the hose be retained so that the area of the passageway be not reduced to thereby stop or impede the flow or passage of materials. It will be appreciated that collapsible hoses for such application would not be acceptable.

In the ordinary vacuum cleaner, the dirt, dust and waste materials must be quickly moved without impedance between the vacuum cleaner inlet and the collecting or refuse bag. The art has paid careful attention to means which will prevent collapse of the substantially circular configuration of such hoses or conduits. In the common vacuum cleaner, the hose may have a continuous side wall of resilient material such as rubber or plastic which is often accordion-pleated to make the hose extensible. Since the hose must be flexible, the continuous side wall has a generally thinner gauge which would collapse without support. Such support is usually provided in the form of a spiral wire frame which maintains the cylindrical configuration of the vacuum hose. The use of such wire results in problems involving difficulty in forming the hose, higher costs, and greater weight. It would be an advantage to provide the art with a flexible and extensible hose which retains its cylindrical configuration in normal use, but which hose does not require the use of a supporting wire frame or the like.

It is accordingly one important object of the present invention to provide a flexible and extensible hose which is formed in an improved manner so that a cylindrical configuration is maintained throughout normal use of such hose for various commercial and consumer uses.

Another important object is a flexible and extensible hose which is formed of resilient material which can be shaped in a circular configuration, and which resiliency biases said material in a way to maintain the circular configuration which has been formed. This object is best served by providing the resilient material in the form of an elongated strip which is interlocked to itself as the strip is wound helically to form a length of hose. In accomplishing this object, the resilient strip is integrally formed to facilitate the formation of the hose to desired lengths by helically winding the strip.

Still another important object of the invention is a flexible and extensible hose of the type described in which the same type of resilient integral material may be used to make hoses of varying cross-sectional diameters and lengths.

It is yet another important object of the invention to provide a hose as described by using an integral and resilient material strip which has convolutions to provide alined channels with opposed and offset entries so that portions and members of the convoluted strip may be seated in the channels as the strip is helically formed, interlocked, and bonded to itself. This object is advantageously obtained by providing convolutions in the integral resilient strip which lead to highly effective interlocking during helical winding while, at the same time, allowing for a lateral displacement of the convoluted members so that the hose, as a whole, is resiliently extensible.

Objects such as the foregoing are attained, together with still other objects which occur to practitioners, by the invention of the following disclosure, including drawings wherein.

The use of the same numerals in the various views will indicate a reference of the same structure, parts or elements as the case may be.

Figure 1:
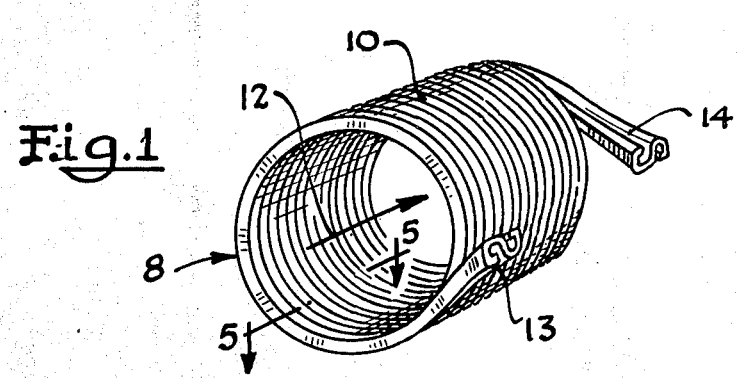
FIG. 1 is a perspective view of a selected length of hose formed with a noncollapsible continuous sidewall according to the invention.

A length of formed hose is shown generally at 8 in FIG. 1, and such hose is formed from an elongated integral strip of resilient material 10, one end whereof is shown at 13 and the other end whereof is shown at 14. The strip 10 is helically wound and interlocked with itself to form a hose of the desired length. The hose has a cylindrical configuration as shown, and a cross-sectional circular area or passageway 12 which retains its configuration. The hose resists collapse, that is, the strip 10 which forms the continuous sidewall retains its cylindrical form because of the resilient nature of the strip 10.

Figure 2:
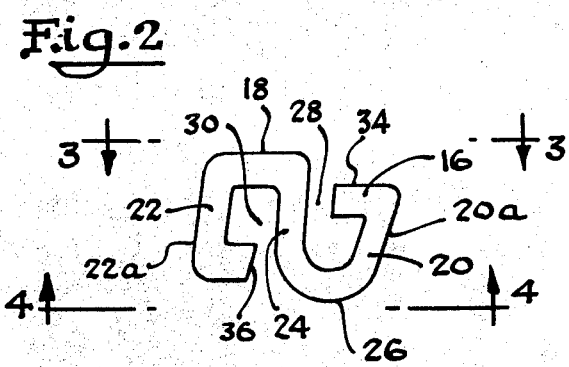
FIG. 2 is a sectional view of a strip of resilient integral material used to form the hose of FIG. 1.
Figure 3:
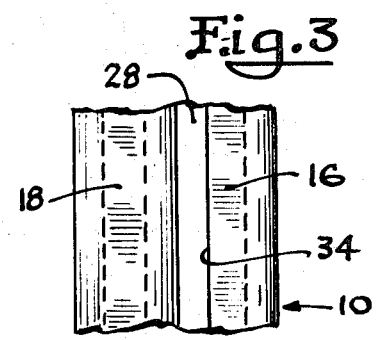
FIG. 3 is a plan view along line 3—3 of FIG. 2.

The body of the strip 10 has sufficient resiliency so that when the strip is formed into a cylindrical configuration, the resiliency of the body of the strip urges the strip towards resumption of its original noncylindrical configuration. Such inherent resiliency has the effect of preventing the continuous sidewall of the hose from collapsing, thereby retaining the circular configuration of the cross-sectional area or passageway 12. Such inherent resiliency is obtained in a strip of the type disclosed herein. The strip is made of a body of solid resilient material which is convoluted in the manner illustrated in FIG. 2.

The cross-sectional convolution of this strip is shown as including a leading planar portion 16 and a following planar portion 18. The portions are substantially coplanar relative to each other. A leading member 20 depends from planar portion 16 and a following member 22 depends from planar portion 18. An intermediate portion 24 also depends from planar portion 18. A connecting portion 26 joins leading and intermediate members 20 and 24.

Intermediate and leading members define a leading channel 28 therebetween; and said intermediate member, together with the following member, defines a following channel 30 therebetween. Channel 28 is shown with an entry partly closed by lip 34 extending normally to the plane of the longitudinal axis of the strip; and channel 30 has its entry partly closed by lip 36 which also extends normally to the plane of the longitudinal axis of the strip. It will be seen that the respective entries of the leading and following channels are on opposite sides of the strip and are laterally offset relative to each other.

The strip is intended to be wound helically about itself so that the following member 22 is seated in leading channel 28, whereupon lips 34, 36 assume a lapping and interlocking relationship. The interlocking of the strip upon itself is indicated in the portion and sectional views of FIGS. 5 and 6. When the strip is interlocked, following member 22 is in leading channel 28 and, at the same time, leading member 20 is seated in following channel 30. The desired interlock is effective partly by the relative side-to-side dimensions of the leading and following members, and the side-to-side dimension of the channels. Such interlock is enhanced with the resilient nature of the body of the strip. The interlock is further and more effectively attained by the lips 34, 36 which form an abutting or lap interlock. The interlock is even more desirably effected by bonding the following and leading members, respectively, in the leading and following channels.

When the strip is wound helically about itself, the bonding material will assure retention of the interlock throughout most expected uses of the hose. The presence of such a bonding material is indicated at 40 in FIGS. 5 and 6. Such bonding material may be applied to either one or both of the channels, or one or more of the members at a point in advance of the formation of the interlock as the strip is wound helically about itself.

Figure 5:
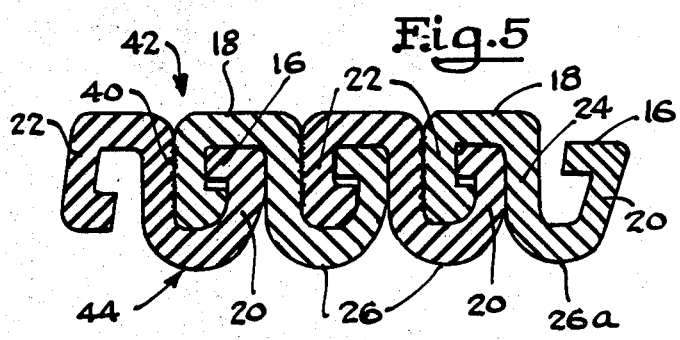
FIG. 5 is a sectional view, in portion, of a length of continuous sidewall of a hose formed by the strip of resilient material of FIGS. 2—4.
Figure 4:
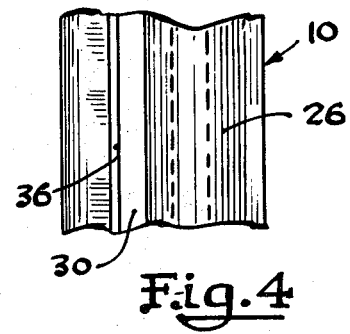
FIG. 4 is a plan view along line 4—4 of FIG. 2.
Figure 6:
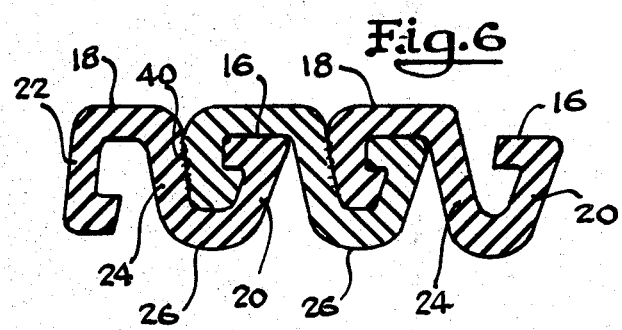
FIG. 6 is a view similar to FIG. 5, but indicating the continuous sidewall in extended position.

After the hose is formed to a desired length, the inside and outside surfaces of the hose will have the appearance illustrated in FIGS. 5 and 6. Planar portion 18 forms a segmental cylindrical surface 42 which has a substantially uniform diameter throughout the passageway 12 of the tube.

In a preferred form, the connecting portion 26 of the strip is arcuate so that the outside of the hose assumes the appearance of alined arcuate hills 44. All three apices 26a of the hills are then tangent to a common plane. The arcuate portion is a preferred embodiment because it facilitates longitudinal extension of the hose during use. The curved connecting portion 26 participates more advantageously in cooperating with the lateral displacement of the intermediate, following and leading members of the strip to effect extension. This condition is indicated in the view of FIG. 6. It will be seen that the resiliency of the body of the strip will urge the depending members to their original nonlateral displaced position. In the formed hose, a pair of interlocked following and leading members 20, 22 are separated by an intermediate member 24.

The planar portion 16 is lowered a sufficient distance relative to planar portion 18 so that the selected length of following member 22 may be fully seated with leading channel 28. The following member 22 terminates short of the connecting portion 26 to facilitate such desired seating.

In the present embodiment, the face 20a of leading member 20 does not form an angle of 90° with planar portion 16. It is angled slightly so that it forms an angle of about 70°. Likewise, the face 22a of the following member 22 is not normal to the planar portion 18, but forms a slightly obtuse angle thereto, say about 100°. The foregoing angular displacements of the leading and following members is not in any sense critical, but merely a selection which now appears to better serve the purpose of resiliently extending the hose along its longitudinal axis.

Various resilient materials may be employed to form the body of the convoluted strip, such as elastomeric resins, among which may be included polyurethane, silicone rubber, polyvinyl chloride and others. It is preferred, however, to employ natural and synthetic rubbers. The widely used neoprene has been found to be particularly useful. In the best practice of the invention, it is required that the bonding material be employed in at least one of the channels or on at least one of the members. The nature of the bonding material will, of course, depend on the nature of the resilient material which is used, but for natural and synthetic rubbers it has been found useful to employ a cyanoacrylate polymer which is modified with a thickening agent and a plasticizer, such as the material supplied by the Eastman Kodak Company, under the trade designation, Eastman 910.

I claim:

1. A resilient hose having a noncollapsible cylindrical configuration, including:

a continuous sidewall formed from an integral strip of convoluted resilient material;

said convoluted strip having a following planar portion and a leading planar portion, a leading member depending from the leading planar portion, a following member and an intermediate member depending from the follow planar portion, an arcuate connecting portion joining the intermediate and leading members at a point remote from the planar portions, a leading channel formed between the leading and intermediate members, a following channel formed between the following and intermediate members, an entry for the leading channel between the planar portions, an entry for the following channel between the following member and connecting portion, a following lip extending laterally from the following member toward said intermediate member, said leading planar portion further forming a leading lip extending towards said intermediate member, said leading and following lips reducing the entries, respectively, of the leading and following channels;

said following members seated in said leading channel and said leading member seated in said following channel when said strip is helically formed;

said leading and following lips overlapping to form an interlock when the following member is seated within the leading channel;

said inside surface of the hose formed by the alternating following planar portions, and the outside surface formed by the aligned arcuate connecting portions of said strips when said hose is formed; and said following member being bonded to said intermediate member in a leading channel in which said member is seated.

2. A resilient hose as in claim 1 wherein the resilient material is of the class of natural rubber and synthetic rubber, the leading planar portion is lowered relative to the following planar portion, and the following member terminates short of the arcuate connecting portion, whereby the planar portion forms a segmental cylindrical surface inside the hose and the connecting arcuate portions form a convoluted surface on the outside of the hose.

3. A resilient hose as in claim 2 wherein the leading planar portion is lowered a sufficient distance relative to the following planar portion so that the selected lengths of the following member may be fully seated within the leading channel, said leading member further having a face which forms an angle of about 70° relative to said leading planar portion, and said following member having a face which forms an angle of about 100° relative to the following planar portion.